United States Patent
Song

(10) Patent No.: US 11,113,680 B2
(45) Date of Patent: Sep. 7, 2021

(54) SELF-SERVICE CHECKOUT COUNTER CHECKOUT

(71) Applicant: Advanced New Technologies Co., Ltd., Grand Cayman (KY)

(72) Inventor: Yang Song, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/810,670

(22) Filed: Mar. 5, 2020

(65) Prior Publication Data

US 2020/0334650 A1   Oct. 22, 2020

Related U.S. Application Data

(63) Continuation of application No. PCT/CN2020/072059, filed on Jan. 14, 2020.

(30) Foreign Application Priority Data

Apr. 16, 2019  (CN) .......................... 201910305807.9

(51) Int. Cl.
*G06Q 20/20* (2012.01)
*G07G 1/00* (2006.01)
(Continued)

(52) U.S. Cl.
CPC ........... *G06Q 20/201* (2013.01); *G06Q 20/18* (2013.01); *G06Q 20/208* (2013.01); *G06T 7/11* (2017.01); *G07G 1/0054* (2013.01)

(58) Field of Classification Search
CPC ............. G06K 9/00624; G06K 7/1491; G06K 7/1404; G06K 7/1443; G06Q 20/201;
(Continued)

(56) References Cited

U.S. PATENT DOCUMENTS 3,027,668 A   4/1962  Hardesty
6,457,644 B1  10/2002 Collins, Jr. et al.
(Continued)

FOREIGN PATENT DOCUMENTS

CN  102799850   11/2012
CN  202904599    4/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Russell S Glass
(74) *Attorney, Agent, or Firm* — Fish & Richardson P.C.

(57) ABSTRACT

Computer-implemented methods, non-transitory, computer-readable media, and computer-implemented systems for self-service checkout counter checkout. One computer-implemented method includes: obtaining, by using a camera, an image of at least one product placed on a checkout counter; performing image segmentation on the image to obtain at least one image region; identifying a product code included in a code region in an image region of the at least one image region; determining, based on the product code, a product category of a product associated with the product code; and determining a price of the product based on the product category.

30 Claims, 10 Drawing Sheets

(51) Int. Cl.
*G06T 7/11* (2017.01)
*G06Q 20/18* (2012.01)

(58) Field of Classification Search
CPC .... G06Q 20/18; G06Q 20/208; G07G 1/0054; G07G 1/0063; G06T 7/11; G06T 2207/20081; G06T 7/12
USPC .......................................................... 705/20
See application file for complete search history.

(56) References Cited

U.S. PATENT DOCUMENTS

| | | | |
|---|---|---|---|
| 8,917,905 | B1 | 12/2014 | Dill |
| 2013/0304595 | A1 | 11/2013 | Gonalves |
| 2014/0177912 | A1 | 6/2014 | Okamura |
| 2014/0263603 | A1 | 9/2014 | Jones et al. |
| 2015/0103522 | A1 | 4/2015 | Liu et al. |
| 2017/0249491 | A1* | 8/2017 | MacIntosh ........... G06K 9/4604 |
| 2020/0336656 | A1* | 10/2020 | Nyallau ............... G06N 3/0454 |

FOREIGN PATENT DOCUMENTS

| | | | | | |
|---|---|---|---|---|---|
| CN | 103226687 | | 7/2013 | | |
| CN | 105718833 | | 6/2016 | | |
| CN | 105718833 | A * | 6/2016 | ........... | G06K 7/1443 |
| CN | 205739268 | | 11/2016 | | |
| CN | 106326802 | | 1/2017 | | |
| CN | 105242100 | | 3/2017 | | |
| CN | 106529365 | | 3/2017 | | |
| CN | 106529365 | A * | 3/2017 | | |
| CN | 107578582 | | 1/2018 | | |
| CN | 108062837 | | 5/2018 | | |
| CN | 207529487 | | 6/2018 | | |
| CN | 109190439 | | 1/2019 | | |
| CN | 109389068 | | 2/2019 | | |
| CN | 109522967 | | 3/2019 | | |
| CN | 109558867 | | 4/2019 | | |
| CN | 110264645 | | 9/2019 | | |
| JP | 2014089669 | A * | 5/2014 | ......... | G06K 9/00624 |
| KR | 20180077910 | | 7/2018 | | |

OTHER PUBLICATIONS

Nakamoto, "Bitcoin: A Peer-to-Peer Electronic Cash System," www.bitcoin.org, 2005, 9 pages.
PCT International Search Report and Written Opinion in International Appln. No. PCT/CN2020/071402, dated Mar. 26, 2020, 17 pages (with partial English machine translation).
PCT International Search Report and Written Opinion in International Appln. No. PCT/CN2020/072059, dated Apr. 17, 2020, 19 pages (with partial English machine translation).
U.S. Appl. No. 16/816,503, Song, filed Mar. 12, 2020.
U.S. Appl. No. 16/816,503, filed Mar. 12, 2020, Song.

* cited by examiner

SELF-SERVICE CHECKOUT COUNTER CHECKOUT

CROSS-REFERENCE TO RELATED APPLICATIONS

This application is a continuation of PCT Application No. PCT/CN2020/072059, filed on Jan. 14, 2020, which claims priority to Chinese Patent Application No. 201910305807.9, filed on Apr. 16, 2019, and each application is hereby incorporated by reference in its entirety.

TECHNICAL FIELD

The present specification relates to the field of computer technology, and in particular, to methods and devices related to self-service checkout counter checkout.

BACKGROUND

The development of technologies has contributed to the reform of the retail sector. In the new retail sector, self-service checkout counters are used to improve checkout counter checkout efficiency and reduce labor cost. In some solutions, a customer can align the barcode of a product to a scanning area of the checkout counter, so as to identify the category of the product.

This solution requires the customer to find the barcode of the product and assist the machine to read the barcode. There is a high participation requirement for the user. In addition, checkout counter checkout can be performed for products one by one, and user experience still needs to be improved.

SUMMARY

One or more implementations of the present specification describe methods and devices related to self-service checkout counter checkout, where code identification and visual identification are combined to improve efficiency and accuracy of product identification and improve user experience.

According to a first aspect, some implementations of the present specification provide a self-service product checkout counter checkout method, including: obtaining a first image, where the first image is obtained by a first camera by photographing at least one product placed on a checkout counter; performing image segmentation on the first image to obtain at least one image region, where the at least one image region includes a first image region; detecting a code region of a product code in the first image region; when the code region is detected, identifying a code in the code region, and determining, based on the identified code, a category of a first product included in the first image region; when the code region is not detected or the code cannot be identified, identifying the category of the first product based on the first image region by using visual identification; and determining a pricing result of the first product based on the category of the first product.

In some implementations, obtaining a first image includes: controlling the first camera to photograph the at least one product to obtain the first image.

In some other implementations, obtaining a first image includes receiving the first image from a self-service checkout counter.

In a different implementation, the first image is shot from one of a top direction, a front direction, a left direction, a right direction, a rear direction, and an oblique direction of the at least one product, and the oblique direction is that an angle between a shooting direction and a vertical direction of the checkout counter is 30 degrees to 60 degrees.

In some implementations, performing image segmentation on the first image includes: performing image segmentation on the first image by using an image segmentation model, where the image segmentation model is obtained by pre-training segmentation sample pictures, and the segmentation sample pictures include a product image and have labeling data for labeling a product contour.

According to some implementations, the product code is a barcode; and in this case, detecting a code region of a product code in the first image region includes: detecting a barcode region in the first image region by using a first object detection model, where the first object detection model is obtained by pre-training first training sample pictures, and the first training sample pictures include a product image and have labeling data for framing a barcode region in the product image.

Further, in some implementations, identifying a code in the code region includes: correcting the detected barcode region by using perspective transformation to obtain a corrected barcode; and performing code identification on the corrected barcode.

According to some other implementations, the product code is a two-dimensional code; and detecting a code region of a product code in the first image region includes: detecting position markers of the two-dimensional code in the first image region, and when at least two position markers are detected, determining that a two-dimensional code region is detected.

Further, in some implementations, identifying a code in the code region includes: correcting the detected two-dimensional code region by using perspective transformation to obtain a corrected two-dimensional code; determining a corner-module relationship in the corrected two-dimensional code based on the at least two position markers; and extracting a code feature from the corrected two-dimensional code based on the corner-module relationship, so as to identify the two-dimensional code.

In some implementations, visual identification includes: determining the category of the first product based on the first image region by using a second object detection model, where the second object detection model is obtained by pre-training second training sample pictures, and the second training sample pictures include a product image and have labeling data for framing a product and labeling a product category.

In some implementations, the method further includes: obtaining a second image, where the second image is obtained by a second camera by photographing the at least one product; performing image segmentation on the second image to obtain at least a second image region; determining a category of a second product corresponding to the second image region by using code identification or visual identification; determining, based on a relative position relationship between the first camera and the second camera, that the first image region and the second image region are corresponding to the same product; and excluding a pricing result of one of the first product and the second product from a product pricing result.

According to a second aspect, a self-service product checkout counter checkout method is provided, where the method includes: obtaining multiple images, where the multiple images are separately obtained by multiple cameras by photographing at least one product placed on a checkout counter; separately performing image segmentation on the multiple images to obtain an image region corresponding to each image; determining, based on a relative position relationship of the multiple cameras, multiple image regions corresponding to the same product from the image regions corresponding to all the images; detecting a code region of a product code in the multiple image regions; when a code region is detected in any image region, identifying a code in the code region, and determining a category of the same product based on the identified code; when no code region is detected in the multiple image regions or no code is identified, identifying the category of the same product based on at least one of the multiple image regions by using visual identification; and determining a pricing result of the same product based on the category of the same product.

According to a third aspect, a self-service product checkout counter device is provided, where the device includes: an image acquisition unit, configured to obtain a first image, where the first image is obtained by a first camera by photographing at least one product placed on a checkout counter; an image segmentation unit, configured to perform image segmentation on the first image to obtain at least one image region, where the at least one image region includes a first image region; a code region detection unit, configured to detect a code region of a product code in the first image region; a code identification unit, configured to: when the code region is detected, identify a code in the code region, and determine, based on the identified code, a category of a first product included in the first image region; a visual identification unit, configured to: when the code region is not detected or the code cannot be identified, identify the category of the first product based on the first image region by using visual identification; and a pricing unit, configured to determine a pricing result of the first product based on the category of the first product.

According to a fourth aspect, a self-service product checkout counter device is provided, where the device includes: an image acquisition unit, configured to obtain multiple images, where the multiple images are separately obtained by multiple cameras by photographing at least one product placed on a checkout counter; an image segmentation unit, configured to separately perform image segmentation on the multiple images to obtain an image region corresponding to each image; a region relationship determining unit, configured to determine, based on a relative position relationship of the multiple cameras, multiple image regions corresponding to the same product from the image regions corresponding to all the images; a code region detection unit, configured to detect a code region of a product code in the multiple image regions; a code identification unit, configured to: when a code region is detected in any image region, identify a code in the code region, and determine a category of the same product based on the identified code; a visual identification unit, configured to: when no code region is detected in the multiple image regions or no code is identified, identify the category of the same product based on at least one of the multiple image regions by using visual identification; and a pricing unit, configured to determine a pricing result of the same product based on the category of the same product.

According to a fifth aspect, some implementations of the present specification provide a computer readable storage medium that stores a computer program, and when the computer program is executed on a computer, the computer is caused to perform the method according to the first aspect or the second aspect.

According to a sixth aspect, some implementations of the present specification provide a self-service checkout counter, including a storage device and a processor, the processor is communicatively coupled to the storage device, the storage device stores an application program, and the processor can be configured to execute the application program to implement the method of the first aspect or the second aspect.

According to a seventh aspect, some implementations of the present specification provide a server, including a storage device, a network interface, and a processor, where the processor is communicatively coupled to the storage device and the network interface, the storage device stores a server program, and the processor can be configured to execute the server program to implement the method according to any one of the first aspect or the second aspect.

A scanning speed and precision of a product barcode solution and user experience of a visual identification solution can be achieved by using the self-service checkout counter checkout method and the self-service checkout counter provided in the implementations of the present specification.

BRIEF DESCRIPTION OF DRAWINGS

The previous and/or additional aspects and advantages of the present application are apparent and comprehensible in the following descriptions of implementations with reference to the accompanying drawings.

DESCRIPTION OF IMPLEMENTATIONS

Figure 1:
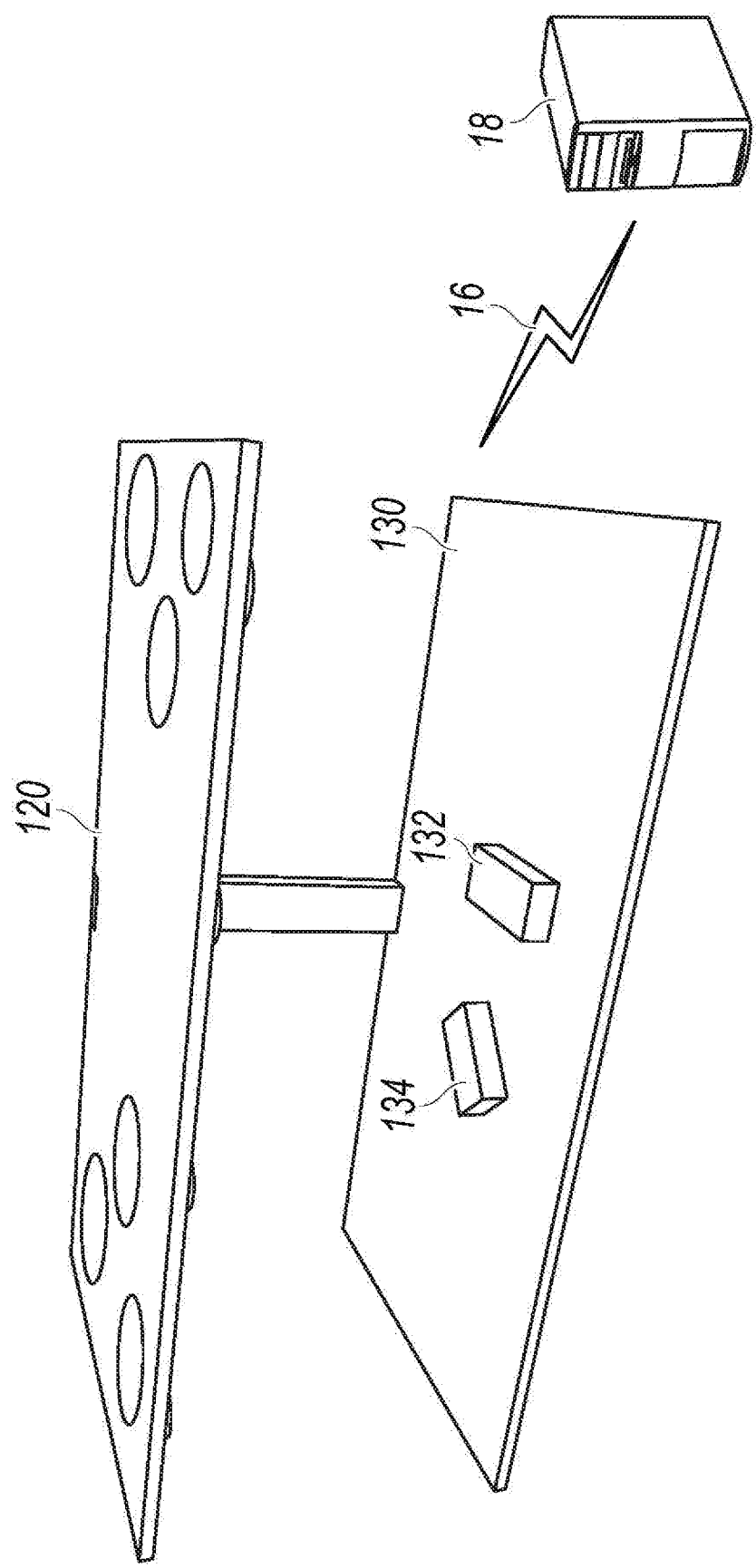
FIG. 1 is a schematic diagram illustrating a scenario of a self-service checkout counter system disclosed in the present specification.

The implementations of the present application are described in detail below, and examples of the implementations are shown in the accompanying drawings. The same or similar reference numerals represent the same or similar modules or modules having the same or similar functions. The implementations described below with reference to the accompanying drawings are examples, are merely intended to explain the present application, and should not be construed as a limitation on the present application.

In the new retail sector, self-service checkout counters are widely used to improve checkout counter checkout efficiency and reduce labor cost. A solution for performing product identification based on machine vision has become one of mainstream solutions in the industry because of its cost and precision. However, in the visual solution, product identification is performed by using a machine learning algorithm based on a product appearance. Due to external lighting, product placement angle, etc., 100% identification accuracy is not guaranteed. In addition, a product barcode on the external packing can clearly identify the product. However, it is difficult to ensure that the product code is 100% exposed and identified due to the user's self-service placement.

Therefore, the present specification provides a hybrid method that visual identification is combined with product code identification. During product identification, the product barcode can be identified first. If the product barcode can be identified, the product category can be obtained quickly and accurately. If the product barcode cannot be detected or the product barcode cannot be identified, normal visual identification is enabled to detect the product.

FIG. 1 is a schematic diagram illustrating a scenario of a self-service checkout counter checkout system disclosed in the present specification. As shown in FIG. 1, the self-service checkout counter checkout system includes a self-service checkout counter 12 and a server system 18. The self-service checkout counter and the server system can be connected by using a network 16.

The self-service checkout counter 12 can include a countertop 130 and a panel 120 that are disposed opposite to each other. The countertop 130 is located below and is configured to carry one or more products 132 and 134. The panel 120 is located above, and provides an ideal lighting environment for the product on the countertop, so lighting for the product is stable, which facilitates product detection or running of an identification algorithm.

The self-service checkout counter can be configured with at least one camera. The camera can shoot videos or images of the products 134 and 132 placed on the checkout counter to obtain videos or images of the products. The videos or images can include a video or image part of each product in the multiple products. For ease of description, the following uses only the image as an example. A person skilled in the art should be aware that the image in the present specification can be a directly shot image, or can be an image extracted from the video.

According to the checkout counter of this implementation of the present specification, a user can randomly place the products on the countertop 130 of the checkout counter. In other words, forms and positions of the products on the countertop can be different.

The self-service checkout counter 12 sends the videos or images to the server system over the network. The network 16 can be a wired network, a wireless network, a local area network, the Internet, etc.

The server system 18 determines a category of each product based on the images by using product code detection and/or visual identification. Specifically, in some examples, the server system first segments the image, and detects and identifies a product code included in the segmented image region. If the product code can be normally read from the image region, the product category can be accurately obtained and identified. For an image region related to a certain product but from which a product code cannot be read, a visual identification algorithm is enabled to detect the product category.

The server system or the self-service checkout counter can determine a pricing result of the product based on the identified product category.

Those skilled in the art should be aware that product code detection and visual identification can be implemented by a single server. The server system can include multiple servers, which simultaneously or separately perform corresponding detection or identification as required. For example, product image segmentation is performed by server A, product code detection is performed by server B, and visual identification is performed by server C. Therefore, in the present specification, the server can refer to a single server itself or can be a server cluster.

In addition, although FIG. 1 illustrates an example of product identification performed by the server based on the product image, product identification and pricing can be performed by a computing device disposed in the checkout counter. In this case, the computing device directly obtains the images shot by the camera, and does not need to send the images to the server.

In the previous hybrid method, the solution in the present specification can combine advantages of barcode identification and visual identification, and implement automatic checkout counter checkout while ensuring user experience.

It should be understood that the overall architecture, settings, operations, and components of the self-service checkout counter checkout system are merely examples, and differently configured systems can also be used to implement the method example disclosed in the present disclosure.

Figure 2:
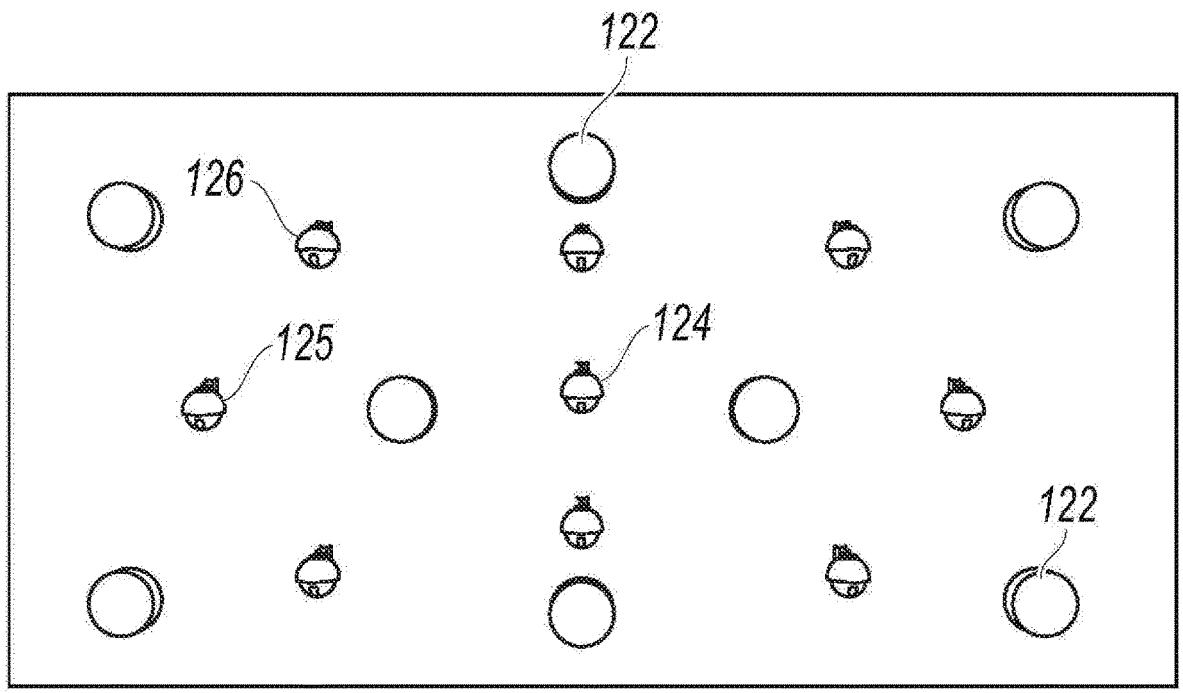
FIG. 2 shows a bottom view of a panel seen from below.

FIG. 2 shows a bottom view of a panel seen from below. The panel can be opaque or translucent, so as to block external light from the ceiling or other angles, thereby avoiding uncontrollable impact of external light on product lighting. The panel can have multiple shapes, such as a rectangle or an arc, and there are extended covers on both sides. Any panel shape can be accepted as long as the shape can block or partially block the above light source.

As shown in FIG. 2, the panel includes one or more light sources 121 and 122. The light source can be an LED etc. The light source can be located on a lower surface of the panel, or can be embedded in the panel. The light source stabilizes lighting of the product placed on the self-service checkout counter, which facilitates running of the product identification algorithm. In some application scenarios, the number and disposing of the light sources can have many options, and two light sources, four light sources, and even more light sources can be selected. A layout method can also be customized as needed. The key to visual product identification is to obtain clear pictures, and stable and uniform lighting provides good assurances.

The light source can be in a form of a controllable light source, and brightness of the light source is adjusted with a working environment.

One or more cameras 124, 125, and 126 can be disposed on the self-service checkout counter. The camera can be a common RGB camera, or can be a 3D camera. These cameras are disposed based on the field of view (FOV) of the cameras and the size of the product placement platform. Multiple cameras can obtain images from different angles, thereby effectively avoiding blocking. When there is only one camera, a slide rail can be configured, so the camera slides on the slide rail to obtain product images at different angles.

In an example, different cameras can obtain images of a product in at least one of a top direction, a front direction, a left direction, a right direction, or a rear direction of the product. To obtain an image in the front direction, the rear direction, the left direction, or the right direction, the camera can be mounted on another object other than the panel.

In an example, the camera can further obtain an image in an oblique direction of the product. The oblique direction refers to a direction in which an angle between a shooting direction and a vertical direction of the checkout counter countertop is in the range of 30 degrees to 60 degrees, and the shooting direction is a direction in which a center line of the FOV of the camera.

Figure 3:
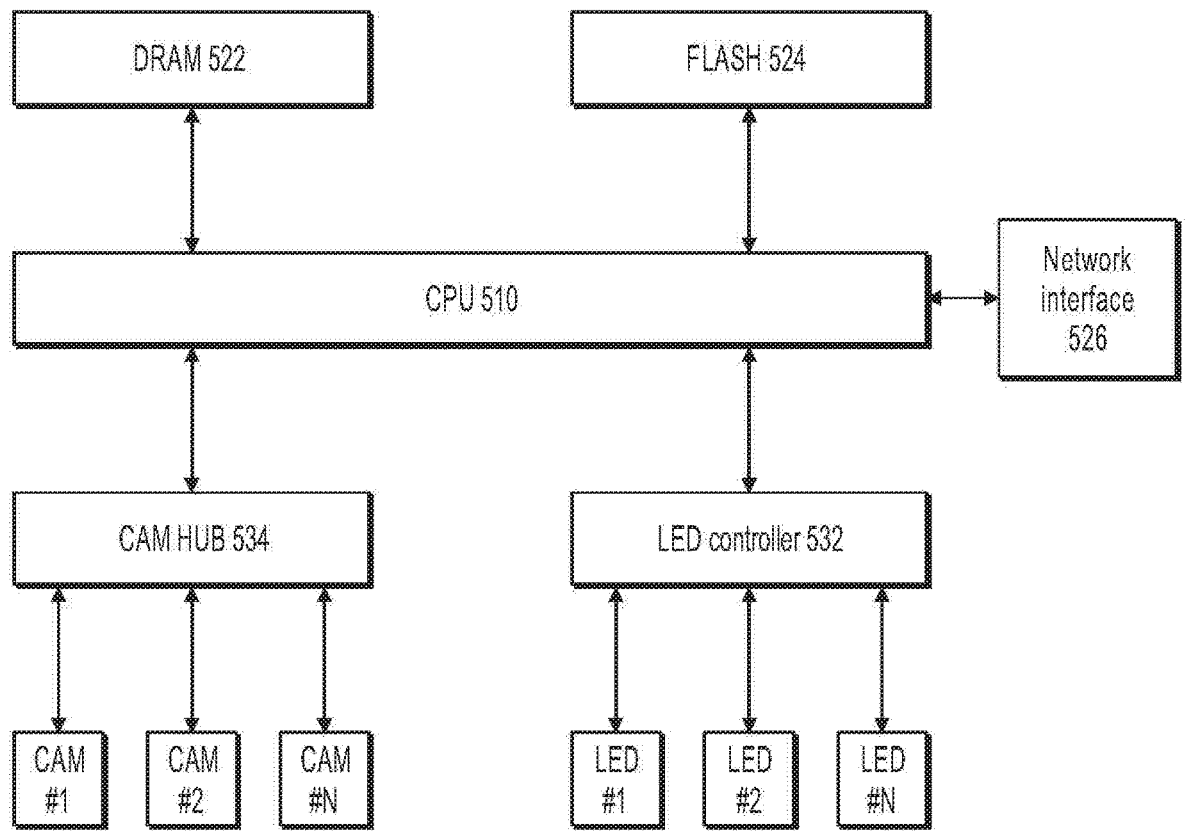
FIG. 3 is a schematic diagram illustrating an electronic structure of a computing device in a self-service checkout counter, according to some implementations of the present specification.

To implement self-service checkout counter checkout, the self-service checkout counter further needs to be equipped with a corresponding computing device. FIG. 3 is a schematic diagram illustrating an electronic structure of a computing device in a self-service checkout counter, according to some implementations of the present specification. The electronic structure of the self-service checkout counter can include multiple electronic components or devices. As shown in FIG. 3, a processor 510 controls overall operations of the computing device. An LED controller 532 can be configured to control multiple LED lights (LED #1, LED #2, LED #N) so the lights provide uniform and stable lighting. A CAM HUB 534 is a camera hub, and can be configured to control two or more cameras (CAM #1, CAM #2, CAM #N) to obtain images. Optionally, the computing device can further include a network/bus interface 526 coupled to a data link, and configured to perform data communication with a server. The network/bus interface 526 can further receive images from the cameras. In the case of a wireless connection, the network/bus interface 526 can include a wireless transceiver. The electronic device further includes a FLASH 524. In some examples, the FLASH 524 can store software, and the software is loaded into a DRAM 522 from the FLASH to control the CPU 510 to perform corresponding operations.

Figure 4:
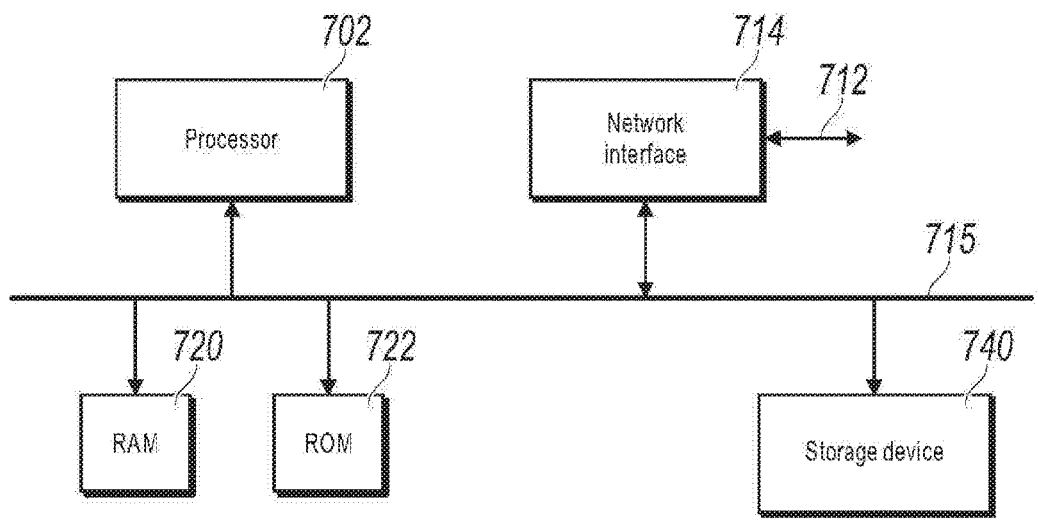
FIG. 4 is a structural diagram illustrating an image identification server, according to some implementations of the present specification.

FIG. 4 is a structural diagram illustrating an image identification server, according to some implementations of the present specification. As shown in FIG. 4, the server can include a processor 702 that represents a microprocessor configured to control overall operations of the server. A data bus 715 can facilitate data transmission among a storage device 740, the processor 702, and a network interface 714.

The server further includes the storage device 740, and the storage device can store a server program. The terminal device can further include a random access memory (RAM) 720 and a read-only memory (ROM) 722. The ROM 722 can store a program, a utility program, or a process, such as an operating system, in a non-volatile way. The RAM 720, also referred to as a memory, can provide volatile data storage, and store instructions and related data for running an operating system and a server program.

During operation, the server program is loaded into the RAM 720 from the RAM 740, to control the processor 702 to perform corresponding operations.

Figure 5:
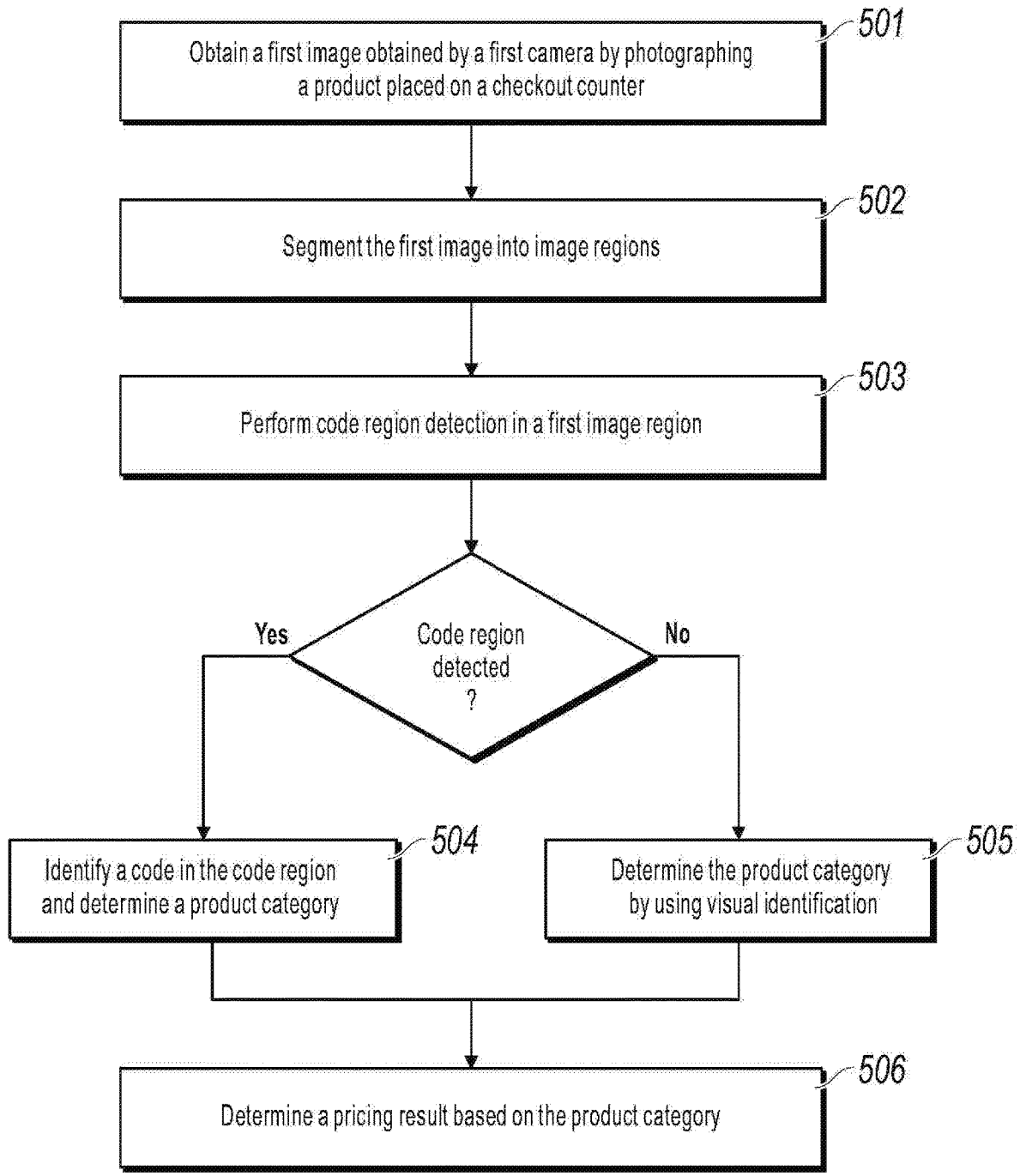
FIG. 5 is a schematic flowchart illustrating a product identification and pricing method, according to some implementations of the present specification.

FIG. 5 is a schematic flowchart illustrating a product identification and pricing method, according to some implementations of the present specification. The method can be compiled into software, and implemented by the computing device of the checkout counter shown in FIG. 3 or the server shown in FIG. 4. Or the method can be implemented by the computing device of the checkout counter and the server together, and the computing device of the checkout counter and the server each executes a part of the method procedure.

As shown in FIG. 5, first, in step 501, a first image is obtained, and the first image is obtained by a first camera by photographing at least one product placed on the checkout counter.

As described above, one or more cameras can be disposed in the checkout counter for photographing the product. When only one camera is disposed, an image shot by the camera is the first image. When multiple cameras are disposed, the multiple cameras can photograph, from different angles, the product placed on the countertop to generate multiple images. In this case, for clarity and simplicity of description, any one of the cameras can be referred to as the first camera, and a product image shot by the camera is referred to as the first image. It should be understood that "first" and "second" in the present specification are merely used for distinguishing during description, and are not intended to limit an occurrence sequence etc.

In some implementations, the method is performed by the computing device of the checkout counter. In this case, in step 501, the computing device controls the first camera in the checkout counter to photograph the product placed on the countertop to obtain the first image.

In some other implementations, the method is performed by the server. In this case, the first camera in the checkout counter generates the first image by photographing the product on the countertop, and the computing device sends the first image to the server by using the network/bus interface shown in FIG. 3. Correspondingly, in step 501, the server receives the first image from the self-service checkout counter, so as to obtain the first image.

Next, in step 502, image segmentation is performed on the first image to obtain at least one image region.

Image segmentation can be implemented by using multiple algorithms and/or models.

In some implementations, image segmentation can be performed based on conventional image processing, including object boundary identification based on pixel grayscale or contrast analysis (similar to a boundary identification approach in a matting tool). Based on boundaries identified, the image can be segmented into several image regions. Generally, each image region is corresponding to one identified object, that is, corresponding to one product in the scenario of this implementation.

Generally, a conventional image processing method is applicable to a case in which a color difference between an object and a background is obvious, a background color is single, and an object boundary is clear. Photographing the product on the countertop is usually more complex, especially in a case of multiple products. Therefore, in some implementations, an image segmentation model is pre-trained to perform image segmentation on the first image to be analyzed.

Specifically, a large number of product pictures can be shot, and the pictures can include a combination of one or more randomly placed products. The product pictures are distributed to labeling personnel, and the labeling personnel label contours of products in the pictures. Such a picture that includes a product image and has a labeled product contour can be used as a segmentation sample picture, and is used to train the image segmentation model. The image segmentation model can be a Mask-RCNN based model, a conditional random field (CRF) based model, etc.

After such an image segmentation model is obtained through training, image segmentation can be performed on the first image by using the model. Generally, by using image segmentation, the first image can be segmented into image regions corresponding to the number of products in the image.

For simplicity of description, that any one of the image regions is referred to as the first image region is used as an example for description below.

Then, in step 503, detection of a code region of a product code is performed in the first image region. If the code region is detected, in step 504, a code in the code region is identified, and a category of a product included in the first image region is determined based on the identified code. If the code region is not detected, in step 505, the category of the product included in the first image region is identified based on the first image region by using visual identification.

It can be understood that currently a barcode is printed on most products. The barcode can uniquely identify a specific type of a product that can be referred to as a category. A seller of the product associates the category of the product with the price in advance. Therefore, the barcode can be identified to directly obtain the category and price information of the product. In addition, some products are printed with a two-dimensional code. In some cases, the category and price information of the product can also be obtained by identifying the two-dimensional code. Therefore, detection on the code region of the product code in step 503 can include bar code detection and two-dimensional code detection. The following describes specific implementations of the previous steps with reference to the two cases.

In some implementations, the previous product code is a barcode. To detect the barcode region, in some implementations, an object detection model can be pre-trained, and the barcode region is detected in the first image region by using the object detection model.

The object detection model is a common model in image identification, and is used to identify a specific target object from a picture. Generally, the object detection model is obtained by training picture samples that are used to label the specific target object. When the barcode region needs to be detected, training sample pictures labeled with a barcode can be used to train the object detection model dedicated to detecting the barcode region.

Specifically, a large number of product pictures can be shot, and the pictures can include a combination of one or more randomly placed products. The product pictures are distributed to labeling personnel, and the labeling personnel label barcode regions of products in the pictures. More specifically, the labeling personnel can use the minimum rectangle that frames the barcode to label the barcode region. As such, a product picture with a barcode labeling frame is obtained, and is used as a training sample picture for training the object detection model.

In this field, various object detection models have been proposed based on various network structures and various detection algorithms. For example, a one-stage detection model can be used to directly determine a category probability and position coordinates of a target object from a picture, that is, directly identify the target object. Typical examples of the one-stage detection model include the SSD model, the Yolo model, etc. A two-stage detection model is used to first generate a candidate region in a picture, which is referred to as a region of interest (ROI), and then performs target identification and bounding box regression in the candidate region. Typical examples of the two-stage detection model include the R-CNN model, the Fast R-CNN model, and the Faster R-CNN model. Other object detection models are also proposed. The previous models of these structures and algorithms can be used as object detection models for detecting barcodes.

As such, the barcode region is detected in the first image region by using the pre-trained object detection model. If the barcode region is detected, in step 504, the code in the barcode region is identified.

In some implementations, barcode identification can be performed by using a conventional barcode reading technology.

However, unlike a conventional checkout counter where a user autonomously places a barcode near a scan window, the checkout counter in this implementation of the present specification allows the user to randomly place multiple products on the countertop. As such, barcodes included in shot images often have various deformations such as skew and distortion. To increase a barcode identification rate, in some implementations, a detected barcode region is first corrected by using perspective transformation to obtain a corrected barcode. The perspective transformation can be implemented by performing a transformation operation by using a projection transformation matrix, so as to obtain a corrected barcode with a normalized shape and direction. Then, code identification can be performed on the corrected barcode to obtain the code.

Figure 6A:
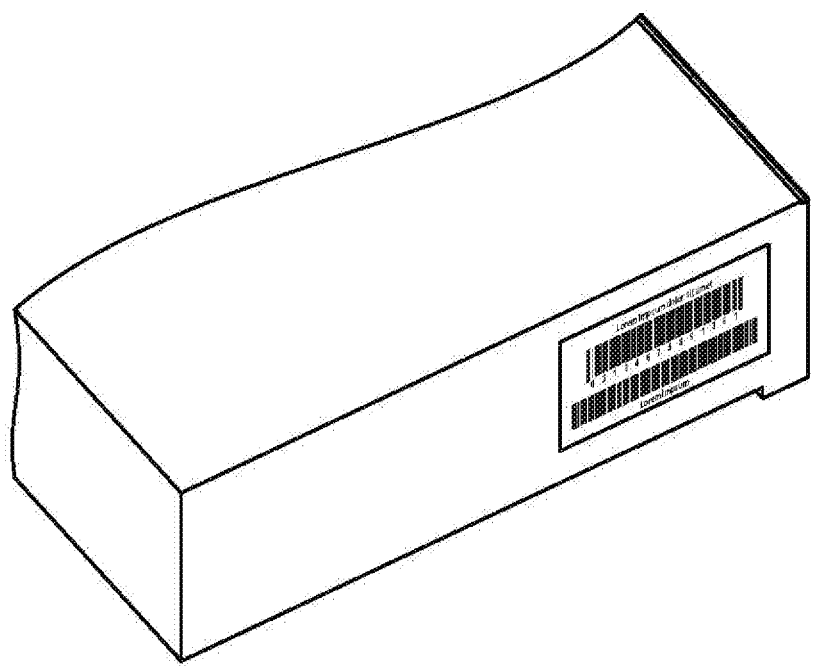
FIGS. 6A-6C illustrate a barcode region that is detected.
Figure 6B:
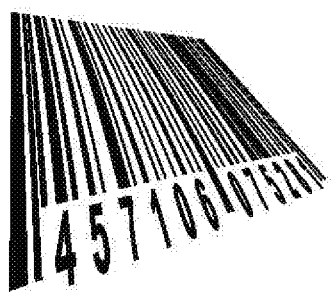
Figure 6C:

FIG. 6A-6C illustrate one example of a barcode region that is detected. FIG. 6A shows a part of an original image obtained by photographing a product. A barcode region can be obtained by performing barcode detection on this part of image region. FIG. 6B shows a deformed barcode obtained from a barcode region in the original image. FIG. 6C shows a corrected barcode obtained after perspective transformation is performed on the barcode of FIG. 6B. A code corresponding to the product can be obtained by identifying the corrected barcode in FIG. 6C.

In some other implementations, the previous product code is a two-dimensional code. The two-dimensional code region can be detected in multiple methods in step 503. In some examples, similar to the barcode, an object detection model is trained for the two-dimensional code, and the two-dimensional code region is detected in the first image region by using the object detection model.

In some other examples, detection is directly performed in the image region by using a structural feature of the two-dimensional code. Specifically, a current two-dimensional code generally has three position markers in the upper left, the upper right, and the lower left corners. The position markers have a specific and significant structural feature. For example, the position markers usually use a "回" shape where a black block is within a black box. Therefore, the positioning pattern can be detected in the image region by using the structural feature. Generally, the two-dimensional code detection generally has a certain fault tolerance. When certain position markers cannot be detected due to a stain, blocking, etc., two position markers are used to restore a graph relationship of the two-dimensional code. Therefore, when at least two position markers are detected, it can be determined that a two-dimensional code is detected.

When it is determined that the two-dimensional code is detected, in step 504, code information in the two-dimensional code region is identified.

As described above, because the user randomly places the product on the checkout counter, the detected two-dimensional code region often has a relatively large deformation, and it is difficult to directly decode the two-dimensional code region. Therefore, in some implementations, the two-dimensional code region is first corrected to determine a graph relationship, and then code identification is performed.

Specifically, in some implementations, first the detected two-dimensional code region is corrected by using perspective transformation, to obtain a corrected two-dimensional code. The perspective transformation can be implemented by performing a transformation operation by using a projection transformation matrix.

Figure 7A:
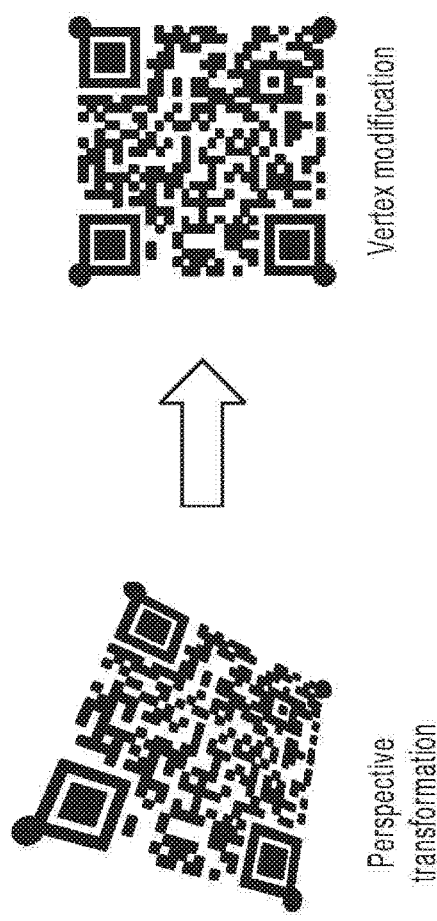
FIG. 7A is a schematic diagram illustrating effects of perspective transformation of a two-dimensional code.

FIG. 7A is a schematic diagram illustrating effects of perspective transformation of a two-dimensional code. As shown in the figure, by using perspective transformation, a vertex of the two-dimensional code region can be corrected to obtain a square two-dimensional code with a normalized shape, that is, a corrected two-dimensional code.

Figure 7B:
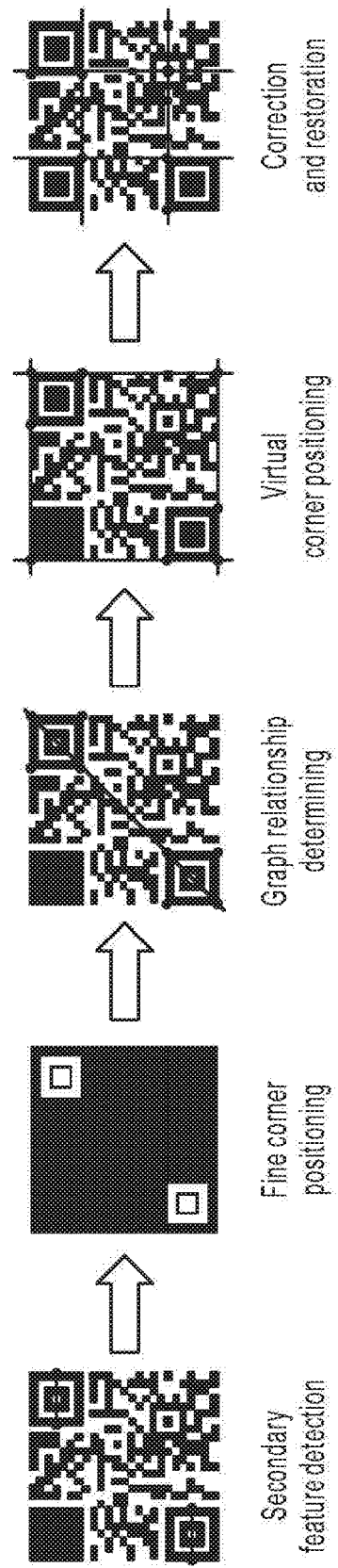
FIG. 7B illustrates sub-stages for determining a corner-module relationship.

Then, a corner-module relationship in the corrected two-dimensional code is determined based on the at least two detected position markers. FIG. 7B illustrates sub-stages of this process.

As shown in FIG. 7B, position marker detection is performed again based on the corrected two-dimensional code, that is, secondary feature detection. Therefore, the positions of the position markers and the position of the corresponding corner are accurately determined. Then, a position relationship (a diagonal relationship or a same-side relationship) between the two detected position markers is determined, and virtual corner positioning is performed based on the position relationship, that is, a corner corresponding to the third position marker is positioned. Finally, the third position marker is filled in a position corresponding to the virtual corner, and a corner-module relationship is restored for the two-dimensional code. When three position markers are detected, virtual corner positioning in FIG. 7B can be omitted, and the corner-module relationship is determined by using secondary detection and fine corner positioning.

Then, a code feature is extracted from the corrected two-dimensional code based on the obtained corner-module relationship, so as to identify the two-dimensional code.

Regardless of the barcode or the two-dimensional code, once the code therein is identified, the category of the product can be accurately determined.

Referring back to FIG. 5, if the code region is not detected in step 503, or the code in the code region cannot be identified, in step 505, the category of the product is identified based on the first image region by using visual identification. The visual identification mainly uses machine learning to train an object detection model, and then directly detects and identifies the product category by using the object detection model.

It should be understood that a different target object for detection requires a different output result. Therefore, the object detection model used for visual identification in step 505 is different from the previous object detection model used for detecting the barcode region.

To train the object detection model used for visual identification, a large number of product pictures can be pre-shot. The pictures can include a combination of one or more randomly placed products, and the product pictures are distributed to labeling personnel. The labeling personnel frame a product in the picture and label a category of the product. As such, the product picture that has the data labeling the product category is obtained, and can be used as a training sample picture to train the object detection model used for visual identification.

After such an object detection model is trained, the object detection model can be used to perform product identification on the first image region, and directly output the category of the product included in the region.

Generally, a large number of sample pictures are required for training the object detection model used for visual identification. In addition, when product identification is performed by using the model, more complex computing needs to be performed, and a relatively large amount of computing resources are consumed. Therefore, in the process of FIG. 5, product code detection with high accuracy and low computing resource consumption is preferentially used to identify the product, and visual identification is enabled when the product code is not detected or the code cannot be identified, so as to ensure that the product can finally be identified.

Once the category of the product corresponding to the first image region is determined, in step 506, a pricing result of the product is determined based on the category of the product. Specifically, the price of the product can be determined based on correlation data that is between the product category and the price and that is recorded in advance by a seller. Finally, the pricing result can include information such as a product name and a product price that are corresponding to the product category.

Steps 503 to 506 describe a process of performing product identification and pricing on any first image region obtained by segmenting the first image. It can be understood that the previous process can be performed on each segmented image region, so as to identify a product in each image region and then perform pricing. Then, a pricing result of each product included in the first image can be obtained.

As described above, to avoid blocking between products, multiple cameras can be disposed in the checkout counter to photograph the product from multiple angles to obtain multiple images. The first image can be any one of the multiple images generated by multi-angle photographing. When the multiple images are obtained, the multiple images can be combined to obtain an overall pricing result of the product on the countertop.

In some implementations, the process shown in FIG. 5 is separately performed for each image in the multiple images shot by the multiple cameras, so as to obtain a pricing result of a product corresponding to each image. Then, image regions corresponding to the same product are determined in each image based on a relative position relationship between the multiple cameras, and pricing of the same product is removed from a pricing result corresponding to the image, so as to avoid repeated pricing of the same product. This process is also called "de-duplication".

Specifically, assume that in addition to the first image, the multiple images include another image, which is referred to as a second image. The second image is obtained by a second camera by photographing the product on the countertop. Similar to FIG. 5, the second image can be segmented to obtain all image regions corresponding to a number of products included in the second image. It can be understood that the number of products included in the second image may be different from that included in the first image. For example, if three products are disposed on the countertop, and one of the products blocks another one in a certain direction, when the first camera shoots in the direction, the first image includes only two products. When the second camera shoots at a different angle, the obtained second image can include three products.

For simplicity of description, assume that the image regions obtained by segmenting the second image include a second image region. For the second image region, similar to steps 503 to 506, a category of a product corresponding to the second image region is determined by using code identification or visual identification.

Then, it is determined, based on a relative position relationship between the first camera and the second camera, whether the first image region and the second image region are corresponding to the same product. It can be understood that after being installed, the multiple cameras can perform position calibration to obtain calibration information. Such calibration information can show a relative position relationship between two cameras, for example, the first camera and the second camera, and an overlapping relationship between shot pictures.

Figure 8A:
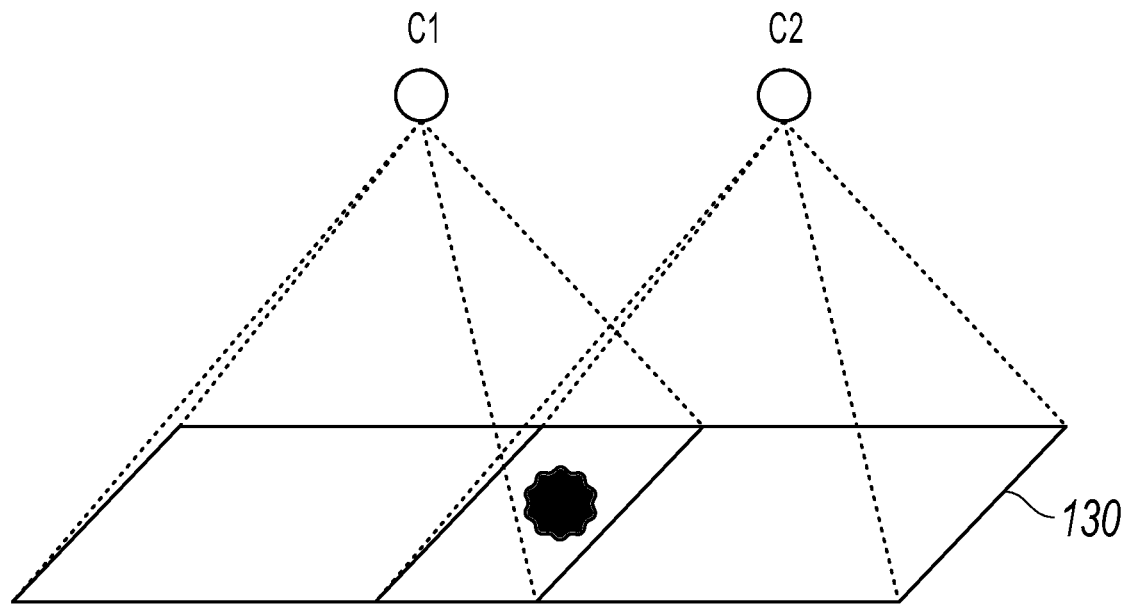
FIGS. 8A and 8B illustrate camera calibration in an example.
Figure 8B:
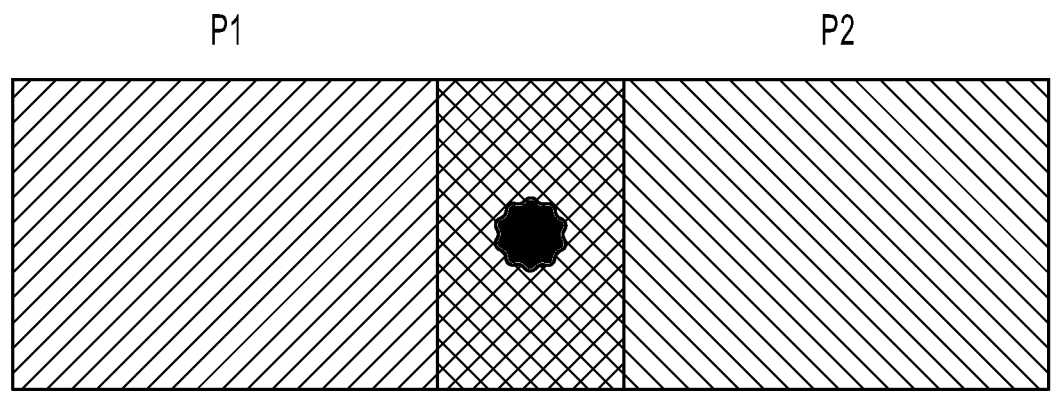

FIGS. 8A and 8B illustrates camera calibration in an example. FIG. 8A illustrates cameras C1 and C2. FIG. 8B illustrates picture P1 shot by camera C1 and picture P2 shot by camera C2. In the example of FIGS. 8A and 8B, assume that cameras C1 and C2 are both fixed on a lighting panel and face a countertop of a checkout counter. After positions (including orientations) of C1 and C2 are fixed, an overlapping area of FOVs of C1 and C2 on the plane corresponding to the countertop of the checkout counter can be determined. Corresponding to overlapping of the FOVs, picture P1 shot by C1 and picture P2 shot by C2 have a corresponding overlapping range, as shown in the shaded part. In a calibration process, the countertop can be labeled by using a marker, then the countertop is photographed by using cameras in fixed positions, and an overlapping relationship between pictures is determined by comparing positions of the marker in pictures shot by the cameras.

For the first camera and the second camera, whether the first image region and the second image region fall into an overlapping region between pictures can be determined based on the calibration information, so as to determine whether the first image region and the second image region are corresponding to the same product.

If the first image region and the second image region correspond to the same product, pricing of the product corresponding to only one of the two regions needs to be included in the product pricing result. In other words, in the product pricing result, a pricing result of the product corresponding to one of the two image regions is excluded.

As such, in the process of combining the multiple images shot by the multiple cameras to obtain the product pricing result, by using the known relative position relationship of the cameras, a repeated product is excluded, so as to avoid repeated pricing of the same product.

The previous describes a process of separately "vertically" performing product identification processing on the multiple images, and then combining processing results of the multiple images. According to some other implementations, image regions of the multiple images can be first "horizontally" combined, and then product identification and pricing are performed.

Figure 9:
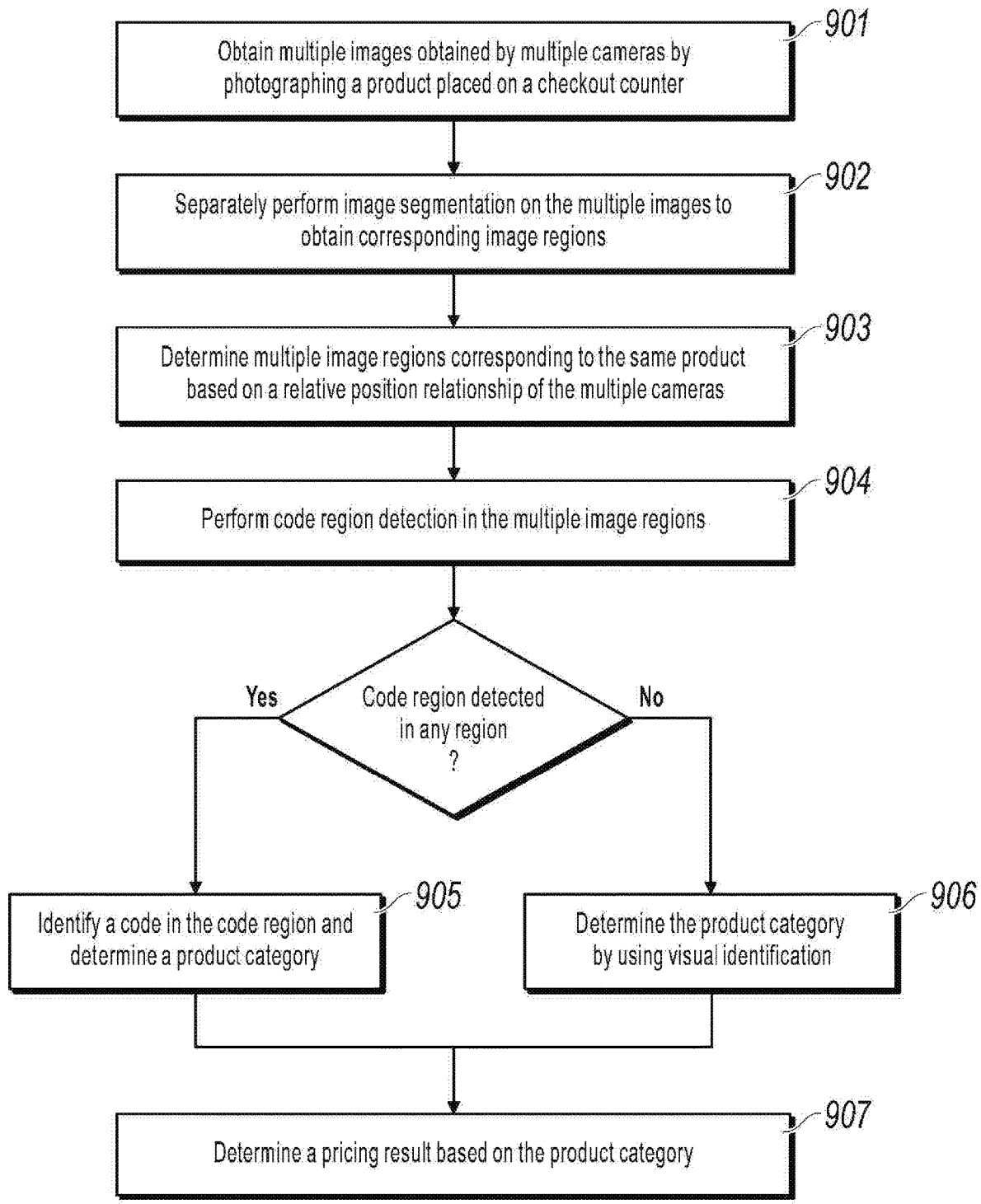
FIG. 9 is a flowchart illustrating product identification and pricing for multiple images, according to some implementations.

FIG. 9 is a flowchart illustrating product identification and pricing for multiple images, according to some implementations. Similar to FIG. 5, the method procedure can be implemented by a computing device in a checkout counter, or can be implemented by a server. As shown in FIG. 9, the method procedure can include the following steps:

In step 901, multiple images are obtained, where the multiple images are obtained by multiple cameras by photographing a product placed on the checkout counter. As described above, the multiple cameras can photograph the product at different positions from different angles to obtain the multiple images.

Then, in step 902, image segmentation is separately performed on the multiple images to obtain image regions corresponding to each image. For an image segmentation method, refer to the previous description of step 502. Details are omitted.

Then, in step 903, it is determined, based on a relative position relationship of the multiple cameras, multiple image regions corresponding to the same product from the image regions corresponding to all the images.

As described above, when the position relationship of the multiple cameras is known, an overlapping relationship between pictures shot by the cameras can be determined by using calibration information of the cameras. As such, the multiple image regions corresponding to the same product can be determined from the image regions of the multiple images.

For example, four products on the countertop are photographed by six cameras to obtain six images. By image segmentation, each of the six images is segmented into several regions. The number of products captured by each camera may be different, and a number of image regions obtained by image segmentation may be different because there may be blocking between products at some angles. For example, five of the six images are segmented into four image regions, and the other image is segmented into three image regions. Then, based on position relationships of the six cameras, image regions corresponding to the same product can be obtained from the image regions obtained by segmenting the six images. A product that is not blocked has a corresponding image region in all six images, and therefore, six image regions corresponding to the product can be obtained. For a product blocked in a certain image, five image regions corresponding to the product can be obtained.

As such, multiple image regions corresponding to the same product are determined from the image regions corresponding to the images.

Then, in step 904, detection on a code region of a product code is performed in the multiple image regions.

For a specific implementation of code region detection of the product code, refer to the previous description with reference to step 503. Details are omitted.

When a code region is detected in any image region corresponding to the same product, in step 905, a code in the code region is identified, and a category of the same product is determined based on the identified code. For a specific implementation of code identification, refer to the previous description with reference to step 504.

If no code region is detected in the multiple image regions, or the code in the code region cannot be identified, in step 906, the category of the same product is identified based on at least one of the multiple image regions by using visual identification. The visual identification process is described as above with reference to step 505.

Therefore, the category of the same product is determined by using code identification in step 905 or visual identification in step 906. Next, in step 907, a pricing result of the same product is determined based on the category of the same product.

In the method procedure in FIG. 9, first multiple image regions corresponding to the same product in multiple images are combined horizontally, and product identification and pricing are comprehensively performed on the multiple image regions. As such, it is unnecessary to "de-duplicate" the product after each image is processed, and code identification is performed only if a code region exists in any image region, thereby minimizing an enabling probability of visual identification and improving overall identification efficiency.

In conclusion, by preferentially performing code identification and then performing visual identification, the user is allowed to randomly place multiple products on the checkout counter for pricing, thereby greatly improving user experience.

The technical solutions disclosed in the present specification are applicable to supermarkets and convenience stores. For example, a self-service checkout counter can be disposed on a fast passage, so users purchasing only a few products can use the self-service checkout counter to price the products. As such, user convenience is improved, and a checkout counter checkout time is greatly shortened.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or code in the computer readable medium. According to some implementations of another aspect, a computer readable storage medium on which a computer program is stored is further provided. When the computer program is executed in a computer, the computer is caused to perform the method described with reference to FIG. 5 and FIG. 9.

Figure 10:
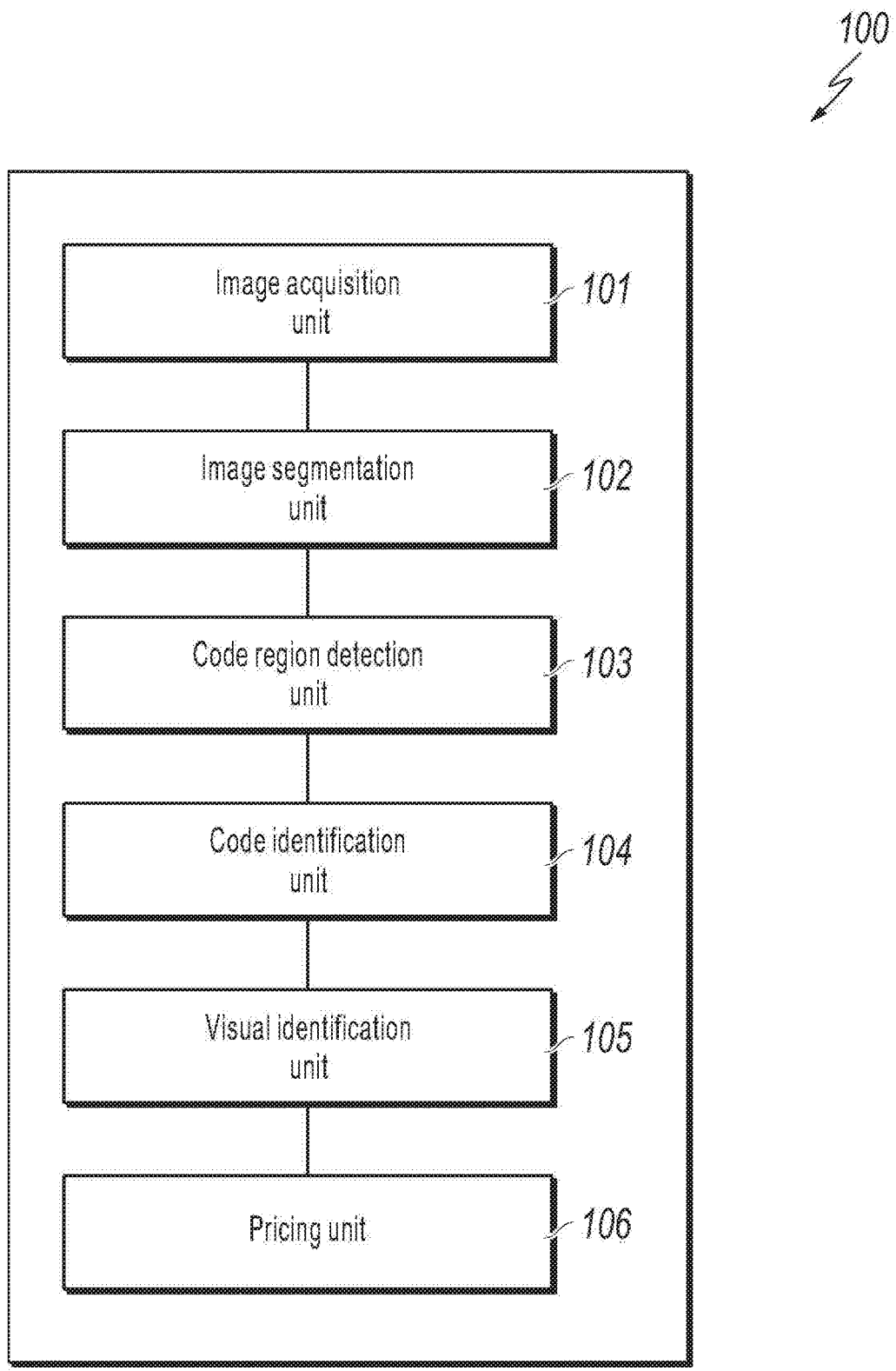
FIG. 10 is a schematic block diagram illustrating a product checkout counter device, according to some implementations of the present specification.
Figure 11:
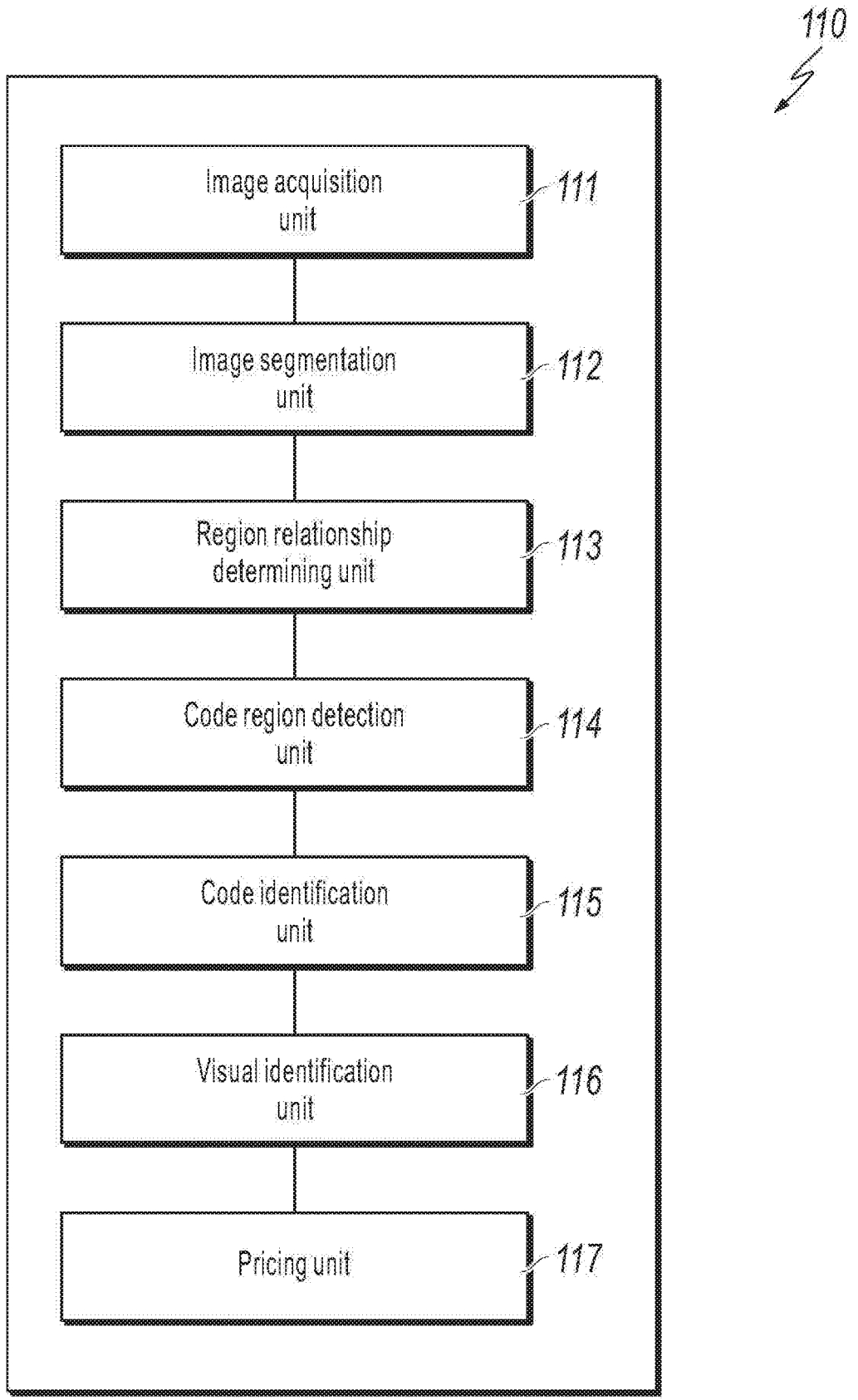
FIG. 11 is a schematic block diagram illustrating a product checkout counter checkout device, according to some other implementations of the present specification.

FIG. 10 and FIG. 11 are schematic diagrams of some possible solutions in which the functions described in the implementations of the present specification use hardware, firmware, a combination thereof, or a combination with software.

FIG. 10 is a schematic block diagram illustrating a product checkout counter checkout device, according to some implementations of the present specification. The device can be deployed in the computing device of the self-service checkout counter shown in FIG. 3, or can be deployed in the server shown in FIG. 4. As shown in FIG. 10, from a perspective of function modules, the device 100 includes: an image acquisition unit 101, configured to obtain a first image, where the first image is obtained by a first camera by photographing at least one product placed on a checkout counter; an image segmentation unit 102, configured to perform image segmentation on the first image to obtain at least one image region, where the at least one image region includes a first image region; a code region detection unit 103, configured to perform code region detection in the first image region; a code identification unit 104, configured to: when the code region is detected, identify a code in the code region, and determine, based on the identified code, a category of a first product included in the first image region; a visual identification unit 105, configured to: when the code region is not detected or the code cannot be identified, identify the category of the first product based on the first image region by using visual identification; and a pricing unit 106, configured to determine a pricing result of the first product based on the category of the first product.

In some implementations, the image acquisition unit 101 is configured to control the first camera to photograph the at least one product to obtain the first image.

In some other implementations, the image acquisition unit 101 is configured to receive the first image from a self-service checkout counter.

In some other implementations, the first image is shot from one of a top direction, a front direction, a left direction, a right direction, a rear direction, and an oblique direction of the at least one product, and the oblique direction is that an angle between a shooting direction and a vertical direction of the checkout counter is 30 degrees to 60 degrees.

In some implementations, the image segmentation unit 102 is configured to: perform image segmentation on the first image by using an image segmentation model, where the image segmentation model is obtained by pre-training segmentation sample pictures, and the segmentation sample pictures include a product image and have labeling data for labeling a product contour.

In some implementations, the code region is a barcode region; and correspondingly, the code region detection unit 103 is configured to: detect a barcode region in the first image region by using a first object detection model, where the first object detection model is obtained by pre-training first training sample pictures, and the first training sample pictures include a product image and have labeling data for framing a barcode region in the product image.

Further, in some implementations, the code identification unit 104 is configured to correct the detected barcode region by using perspective transformation to obtain a corrected barcode; and perform code identification on the corrected barcode.

In some implementations, the code region is a two-dimensional code region; and correspondingly, the code region detection unit 103 is configured to: detect position markers of the two-dimensional code in the first image region, and when at least two position markers are detected, determine that a two-dimensional code region is detected.

Further, in some implementations, the code identification unit 104 is further configured to: correct the detected two-dimensional code region by using perspective transformation to obtain a corrected two-dimensional code; determine a corner-module relationship in the corrected two-dimensional code based on the at least two position markers; and extract a code feature from the corrected two-dimensional code based on the corner-module relationship, so as to identify the two-dimensional code.

In some implementations, the visual identification unit 105 is configured to: determine the category of the first product based on the first image region by using a second object detection model, where the second object detection model is obtained by pre-training second training sample pictures, and the second training sample pictures include a product image and have labeling data for framing a product and labeling a product category.

In some implementations, the image acquisition unit 101 is further configured to obtain a second image, where the second image is obtained by a second camera by photographing the at least one product; the image segmentation unit 102 is further configured to perform image segmentation on the second image to obtain at least a second image region; and the code identification unit 104 or the visual identification unit 105 is further configured to determine a category of a second product corresponding to the second image region.

The device further includes a relationship determining unit (not shown), configured to determine, based on a relative position relationship between the first camera and the second camera, that the first image region and the second image region correspond to the same product; and an exclusion unit, configured to exclude a pricing result of one of the first product and the second product from a product pricing result.

FIG. 11 is a schematic block diagram illustrating a product checkout counter checkout device, according to some other implementations of the present specification. The device can be deployed in the computing device of the self-service checkout counter shown in FIG. 3, or can be deployed in the server shown in FIG. 4. As shown in FIG. 11, from a perspective of function modules, the device 110 includes: an image acquisition unit 111, configured to obtain multiple images, where the multiple images are separately obtained by multiple cameras by photographing at least one product placed on a checkout counter; an image segmentation unit 112, configured to separately perform image segmentation on the multiple images to obtain an image region corresponding to each image; a region relationship determining unit 113, configured to determine, based on a relative position relationship of the multiple cameras, multiple image regions corresponding to the same product from the image regions corresponding to all the images; a code region detection unit 114, configured to perform code region detection in the multiple image regions; a code identification unit 115, configured to: when a code region is detected in any image region, identify a code in the code region, and determine a category of the same product based on the identified code; a visual identification unit 116, configured to: when no code region is detected in the multiple image regions or no code is identified, identify the category of the same product based on at least one of the multiple image regions by using visual identification; and a pricing unit 117, configured to determine a pricing result of the same product based on the category of the same product.

It should be understood that the device deployed in the self-service checkout counter and the server described here can use or combine with the previous described method implementations.

The objectives, technical solutions, and benefits of the present disclosure are further described in detail in the earlier-described specific implementations. It should be understood that the earlier-described descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method for self-service checkout, comprising:
obtaining, by using a camera, an image, wherein the image is of at least one product placed on a checkout counter;
performing image segmentation on the image to obtain at least one image region;
identifying a product code included in a code region in an image region of the at least one image region;
determining that a product category of a product associated with the product code fails to be identified;
in response to determining that the product category fails to be identified, determining the product category by using an object detection model obtained by pre-training using labeled training sample images, each labeled training sample image comprising a rectangle that frames the product code to label the code region, wherein the object detection model generates a candidate image region in the image, performs target identification within the candidate image region, performs bounding box regression in the candidate image region, and corrects the code region by using a perspective transformation relative to position markers to obtain a corrected code region, and determines the product category based on the corrected code region; and
determining a price of the product based on the product category.

2. The computer-implemented method of claim 1, wherein obtaining the image comprises:
controlling the camera to face the at least one product to obtain the image.

3. The computer-implemented method of claim 1, wherein obtaining the image comprises receiving the image from a self-service checkout counter.

4. The computer-implemented method of claim 3, wherein the image is taken from one of a top direction, a front direction, a left direction, a right direction, a rear direction, and an oblique direction of the at least one product, and an angle between the oblique direction and a direction vertical to a countertop of the self-service checkout counter is between 30 degrees to 60 degrees.

5. The computer-implemented method of claim 1, wherein the image segmentation is performed by using an image segmentation model, and the image segmentation model is obtained by pre-training segmentation sample images comprising product images and annotations of silhouettes of products.

6. The computer-implemented method of claim 1, wherein the product code is a barcode, and identifying the product code comprises:
detecting a barcode region in the image region by using an object detection model, the object detection model is obtained by pre-training training sample images comprising product images and annotations for identifying barcode regions in the product images.

7. The computer-implemented method of claim 6, wherein identifying the product code comprises:
adjusting the barcode region based on the perspective transformation to obtain an adjusted barcode region; and
identifying the barcode in the adjusted barcode region.

8. The computer-implemented method of claim 1, wherein the product code is a two-dimensional code, and identifying the product code comprises:
detecting position markers of the two-dimensional code in the image region; and
determining that a two-dimensional code region is detected in response to detecting at least two positioning markers.

9. The computer-implemented method of claim 8, wherein identifying the product code comprises:
adjusting the two-dimensional code region based on the perspective transformation to obtain an adjusted two-dimensional code;
determining a corner-module relationship in the adjusted two-dimensional code based on the at least two positioning markers; and
identifying the two-dimensional code based on the corner-module relationship.

10. The computer-implemented method of claim 1, wherein identifying the product category of the product associated with the product further comprises:
determining the product category based on an object detection model, wherein the object detection model is obtained by pre-training training sample images comprising product images and annotations for identifying products and product categories.

11. The computer-implemented method of claim 1, wherein the image is a first image, the camera is a first camera, the at least one image region is a first at least one image region, the product is a first product, and the method further comprising:

obtaining, by using a second camera, a second image, wherein the second image is of the at least one product;

performing image segmentation on the second image to obtain a second at least one image region;

determining a product category of a second product associated with the second at least one image region based on a product code or visual identification; and determining, based on a relative position between the first camera and the second camera, that the first at least one image region and the second at least one image region are associated with an identical product.

12. A computer-implemented system for self-service checkout, comprising:

one or more computers; and one or more computer memory devices interoperably coupled with the one or more computers and having tangible, non-transitory, machine-readable media storing one or more instructions that, when executed by the one or more computers, perform one or more operations, comprising:

obtaining, by using a camera, an image, wherein the image is of at least one product placed on a checkout counter;

performing image segmentation on the image to obtain at least one image region;

identifying a product code included in a code region in an image region of the at least one image region;

determining that a product category of a product associated with the product code fails to be identified;

in response to determining that the product category fails to be identified, determining the product category by using an object detection model obtained by pre-training using labeled training sample images, each labeled training sample image comprising a rectangle that frames the product code to label the code region, wherein the object detection model generates a candidate image region in the image, performs target identification within the candidate image region, performs bounding box regression in the candidate image region, and corrects the code region by using a perspective transformation relative to position markers to obtain a corrected code region, and determines the product category based on the corrected code region; and determining a price of the product based on the product category.

13. The computer-implemented system of claim 12, wherein obtaining the image comprises:

controlling the camera to face the at least one product to obtain the image.

14. The computer-implemented system of claim 12, wherein obtaining the image comprises receiving the image from a self-service checkout counter.

15. The computer-implemented system of claim 14, wherein the image is taken from one of a top direction, a front direction, a left direction, a right direction, a rear direction, and an oblique direction of the at least one product, and an angle between the oblique direction and a direction vertical to a countertop of the self-service checkout counter is between 30 degrees to 60 degrees.

16. The computer-implemented system of claim 12, wherein the image segmentation is performed by using an image segmentation model, the image segmentation model is obtained by pre-training segmentation sample images comprising product images and annotations of silhouettes of products.

17. The computer-implemented system of claim 12, wherein the product code is a barcode, and identifying the product code comprises:

detecting a barcode region in the image region by using an object detection model, the object detection model is obtained by pre-training training sample images comprising product images and annotations for identifying barcode regions in the product images.

18. The computer-implemented system of claim 17, wherein identifying the product code comprises:

adjusting the barcode region based on the perspective transformation to obtain an adjusted barcode region; and identifying the barcode in the adjusted barcode region.

19. The computer-implemented system of claim 12, wherein the product code is a two-dimensional code, and identifying the product code comprises:

detecting position markers of the two-dimensional code in the image region; and determining that a two-dimensional code region is detected in response to detecting at least two positioning markers.

20. The computer-implemented system of claim 19, wherein identifying the product code comprises:

Adjusting the two-dimensional code region based on the perspective transformation to obtain an adjusted two-dimensional code;

determining a corner-module relationship in the adjusted two-dimensional code based on the at least two positioning markers; and identifying the two-dimensional code based on the corner-module relationship.

21. A non-transitory, computer-readable medium storing one or more instructions executable by a computer-implemented system to perform one or more operations for self-service checkout comprising:

obtaining, by using a camera, an image, wherein the image is of at least one product placed on a checkout counter;

performing image segmentation on the image to obtain at least one image region;

identifying a product code included in a code region in an image region of the at least one image region;

determining that a product category of a product associated with the product code fails to be identified;

in response to determining that the product category fails to be identified, determining the product category by using an object detection model obtained by pre-training using labeled training sample images, each labeled training sample image comprising a rectangle that frames the product code to label the code region, wherein the object detection model generates a candidate image region in the image, performs target identification within the candidate image region, performs bounding box regression in the candidate image region, and corrects the code region by using a perspective transformation relative to position markers to obtain a corrected code region, and determines the product category based on the corrected code region; and determining a price of the product based on the product category.

22. The non-transitory, computer-readable medium of claim 21, wherein obtaining the image comprises:

controlling the camera to face the at least one product placed on the checkout counter to obtain the image.

23. The non-transitory, computer-readable medium of claim 21, wherein obtaining the image comprises receiving the image from a self-service checkout counter.

24. The non-transitory, computer-readable medium of claim 23, wherein the image is taken from one of a top direction, a front direction, a left direction, a right direction, a rear direction, and an oblique direction of the at least one product placed on the self-service checkout counter, and an angle between the oblique direction and a direction vertical to a countertop of the self-service checkout counter is between 30 degrees to 60 degrees.

25. The non-transitory, computer-readable medium of claim 21, wherein the image segmentation is performed by using an image segmentation model, the image segmentation model is obtained by pre-training segmentation sample images comprising product images and annotations of silhouettes of products.

26. The non-transitory, computer-readable medium of claim 21, wherein the product code is a barcode, and identifying the product code comprises:
   detecting a barcode region in the image region by using an object detection model, the object detection model is obtained by pre-training training sample images comprising product images and annotations for identifying barcode regions in the product images.

27. The non-transitory, computer-readable medium of claim 26, wherein identifying the product code comprises:
   adjusting the barcode region based on the perspective transformation to obtain an adjusted barcode region; and
   identifying the barcode in the adjusted barcode region.

28. The non-transitory, computer-readable medium of claim 21, wherein the product code is a two-dimensional code, and identifying the product code comprises:
   detecting position markers of the two-dimensional code in the image region; and
   determining that a two-dimensional code region is detected in response to detecting at least two positioning markers.

29. The non-transitory, computer-readable medium of claim 28, wherein identifying the product code comprises:
   adjusting the two-dimensional code region based on the perspective transformation to obtain an adjusted two-dimensional code;
   determining a corner-module relationship in the adjusted two-dimensional code based on the at least two positioning markers; and
   identifying the two-dimensional code based on the corner-module relationship.

30. The non-transitory, computer-readable medium of claim 21, wherein identifying the product category of the product associated with the product further comprises:
   determining the product category based on an object detection model, wherein the object detection model is obtained by pre-training training sample images comprising product images and annotations for identifying products and product categories.

* * * * *